United States Patent

Kashiwa et al.

[11] 3,833,440
[45] Sept. 3, 1974

[54] METHOD OF MAKING HOLLOW PLANAR BOARD OF SYNTHETIC RESIN MATERIAL

[75] Inventors: Yoshikazu Kashiwa; Kunio Takagi; Seiju Kezuka, all of Yokohama; Rikio Kuroda; Toshiharu Hirayama, both of Kawasaki; Takeshi Kamiya, Kamakura; Masayuki Ono, Iwatsuki, all of Japan; Kabushiki Kaisha Tomoku, 03, Otaru-shi, both of Japan

[73] Assignee: The Nisseki Plastic Chemical Co., Ltd., Kawasaki-ku, Kawasaki

[22] Filed: June 6, 1972

[21] Appl. No.: 260,282

[52] U.S. Cl............ 156/244, 156/282, 156/311, 161/161, 161/127, 161/252
[51] Int. Cl. .................... B29c 19/00, B29b 31/00
[58] Field of Search ........... 156/209, 219, 244, 282, 156/285, 297, 306, 311; 264/129, 19, 293; 161/127, 161, 252

[56] References Cited
UNITED STATES PATENTS
2,800,162 7/1957 Rohdin .............................. 156/282
3,619,344 11/1971 Wolinski et al..................... 156/282

FOREIGN PATENTS OR APPLICATIONS
575,848 0/1959 Canada............................. 156/282

Primary Examiner—George F. Lesmes
Assistant Examiner—Paul Thibodeau
Attorney, Agent, or Firm—Vern L. Oldham

[57] ABSTRACT

A method of making a hollow planar board of synthetic resin consisting of a core and a first and a second liner, in which the temperature of the first liner relative to that of the second liner is suitably controlled to prevent undesirable warping of the product. The core is made by embossing a synthetic resin sheet so as to provide many closed cells in the board.

7 Claims, 10 Drawing Figures

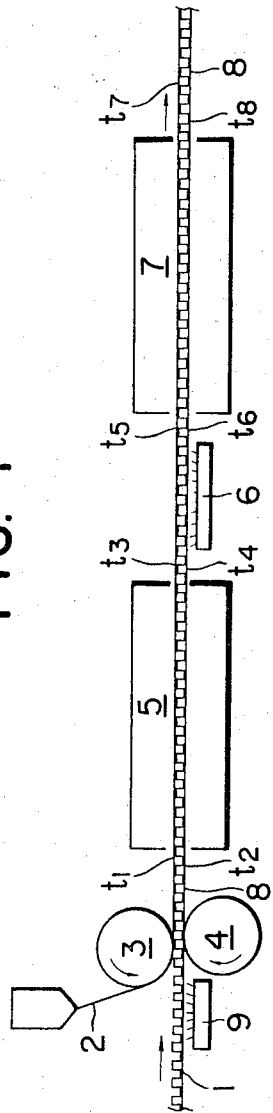
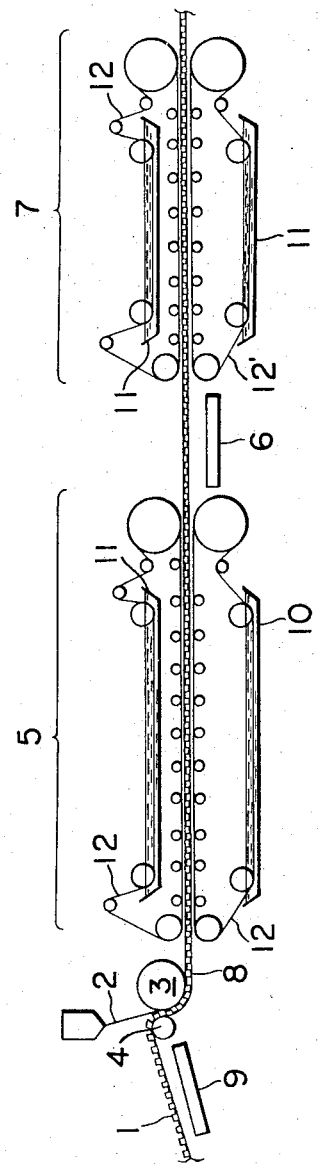
FIG. 1
FIG. 2

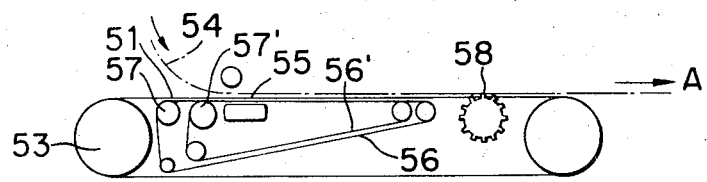
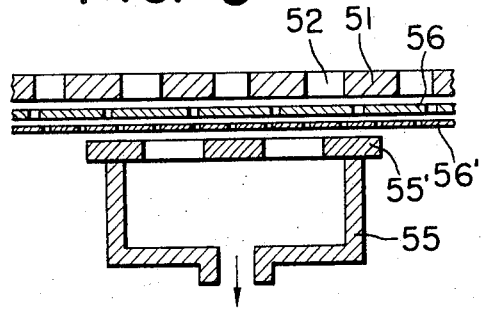
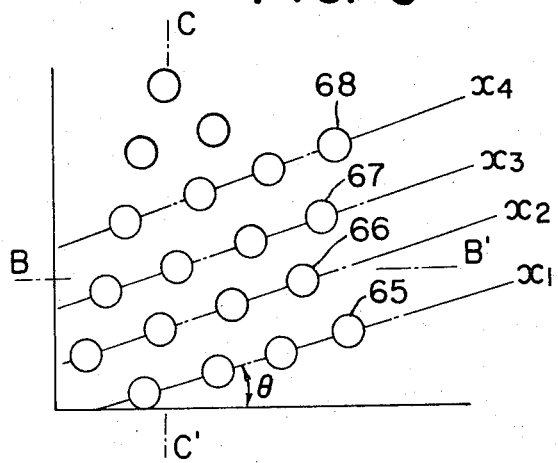
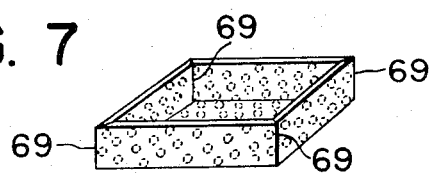

METHOD OF MAKING HOLLOW PLANAR BOARD OF SYNTHETIC RESIN MATERIAL

This invention relates to a method of making a hollow planar board of synthetic resin material.

A hollow planar board consisting of three layers of thermoplastic synthetic resin sheets bonded together has already been proposed as a novel and useful material which replaces the corrugated board of paper material most frequently used hitherto for making a box or container. A most important advantage of the use of such thermoplastic synthetic resin resides in the fact that the synthetic resin sheets can be easily bonded together by fusion without requiring any adhesive, since the synthetic resin is thermoplastic and readily fused by application of heat thereto. Further, the thermoplastic resin is preferred in that the core of the three-layer structure can be easily corrugated or embossed utilizing the thermoplastic property peculiar to the thermoplastic synthetic resin. Furthermore, the synthetic resin of the kind described above is preferable in that a box or container can be easily made by such a hollow planar board utilizing the heat fusibility of the synthetic resin.

However, due to the difficulty attributable to the difference between the property of the material forming the hollow planar board of this kind and the property of the material or paper forming the conventional corrugated board and due to the failure to advantageously utilize the useful property of the thermoplastic synthetic resin, there have occurred various practical problems and the hollow planar board of this kind has not yet entirely replaced the conventional corrugated board because of such problems.

The first problem arises when the core and the liners are bonded together during the manufacture of the hollow planar board of synthetic resin material. More specifically, solidification of the core and the liners from the molten state occurs at different rates and under different temperature conditions during bonding of the liners to the core, resulting in different rates of shrinkage of the core and liners. Thus, distortion tends to occur on the product thereby giving rise to undesirable warping of the product in a direction of the flow or feed or in a direction perpendicular to the above direction. In order to avoid this trouble, it is desirable that these layers are bonded and solidified simultaneously as far as possible. However, while the core and one of the liners can be bonded together and solidified in one step, it is technically difficult to bond the other liner to the bonded structure at the same time for the following reasons: The core cannot withstand the pressure applied for bonding the liner thereto unless the core is cooled to solidify to a considerable degree. On the other hand, even when the liner in a molten state is bonded to the core which is sufficiently cured, the heat energy possesed by the liner is insufficient to establish a firm bond between the core and the liner. It is therefore a common practice to bond the first liner to the core, and after solidifying the same, bond the second liner to the core. This method, however, is defective in that undesirable warping occurs on the product for the reasons above described, resulting in the loss of the commercial value of the product.

The second problem arises during the forming of the core. The core is commonly made by extruding a synthetic resin sheet from an extruder and then embossing the sheet while it is still in a soft or molten state. The problem arises during this step. In the case of embossing treatment on the synthetic resin sheet, an embossing means having many vacuum suction openings is preferably used to apply vacuum suction to the sheet. In this case, portions of the softened synthetic resin sheet may be drawn into the minute holes for vacuum suction thereby tending to clog such minute holes. This tendency becomes more marked when the synthetic resin sheet contains small lump portions.

The problem will be further discussed with reference to the forming of a core into an embossed form. One of conventional apparatuses for making an embossed core comprises an embossing belt provided with a multiplicity of vacuum suction openings for forming independent closed cells on the surface of a synthetic resin sheet, means for guiding the synthetic resin sheet in a soft or molten state along the upper surface of the belt, a fine meshed member bonded to the lower surface of the belt to form the bottom of the openings, and means for applying vacuum suction from beneath the belt. However, this structure is defective in that the meshes of the fine meshed member tend to be clogged with small lump portions which may be contained in the synthetic resin sheet supplied onto the belt in the soft or molten state, since such small lump portions are cooled slowly and drawn into the meshes. The embossing belt must be stopped and cleaned when clogging of the meshes occurs. Because of the fact that the embossing belt and the fine meshed member in the conventional apparatus are unitarily bonded together, an inconvenience is encountered in that this belt must be dismounted from the apparatus each time the cleaning is required.

With a view to overcoming the defects involved in the prior art apparatus and method for making a hollow planar board of synthetic resin material as above described, it is an object of the present invention to provide a novel method of making a warp-free hollow planar board of three-layer structure of synthetic resin material consisting of a core and a pair of a first and a second liner by suitably controlling various conditions in the steps following the step of bonding the second liner to the core.

In accordance with one aspect of the present invention, there is provided a method of making a hollow planar board of synthetic resin material comprising the steps of bonding a first liner to one of the surfaces of a core, bonding to the other surface of said core a second liner while it is still in a molten state although it can maintain its planar shape, feeding the three-layer structure into temperature regulating means for cooling said second liner, and at the same time, heating said first liner while applying a flattening pressure to said three-layer structure so that the temperature of said first liner at a position at which said three-layer structure leaves said temperature regulating means in higher than that of said second liner at said position, and then feeding said three-layer structure into cooling means for cooling said three-layer structure down to room temperature while applying a flattening pressure thereto.

In accordance with another aspect of the present invention, there is provided a method having the features set forth above, which comprises further the step of applying additional heat solely to said first liner by auxiliary heating means disposed immediately behind said temperature regulating means.

Another object of the present invention is to provide a novel method of making a hollow planar board of the kind above described including a core having many embossments, in which the removal of clogging is easily done when such clogging occurs at the vacuum suction side of the embossing means.

In accordance with another aspect of the present invention, there is provided a method of making a hollow planar board of the kind described above, in which said core is prepared by extruding a synthetic resin sheet in a molten state from an extruder, guiding said synthetic resin sheet while still in the molten state onto belt means consisting of an embossing belt having a multiplicity of perforations and an air pervious belt disposed beneath said embossing belt so as to run at the same velocity as that of said embossing belt, and applying vacuum suction to said synthetic resin sheet from beneath the overlapped portion of said belts.

By virtue of the fact that the air pervious belt is provided separately from the embossing belt to constitute the bottom portion of the closed-cell forming belt means, only the air pervious belt may be replaced in the event of occurrence of clogging without appreciably interfering with the continuous operation.

The closed cells in the hollow planar board manufactured according to the present invention are preferably arranged so that the longitudinal row as well as the lateral row thereof makes an angle other than 90° with respect to the edges of the board. This closed cell arrangement is advantageous in that, when the board is cut to form a box, the cutting line in whatever direction cuts necessarily across the substantially same number of closed cells. Further, a plurality of such closed cells may communicate with each other to form a closed cell unit, and these closed cell units may be arranged in staggered relation from each other. This latter arrangement is advantageous in that when desired the board may be given directional property in mechanical strengths as in the case of conventional corrugated cardboard.

The foregoing and other additional objects and advantages of the present invention will appear more fully hereafter from a consideration of the detailed description which follows, taken together with the accompanying drawings wherein embodiments of the present invention are illustrated.

FIG. 1 is a schematic sectional view of an apparatus adapted for making a hollow planar board of synthetic resin material according to an embodiment of the present invention.

FIG. 2 is a view similar to FIG. 1, showing in detail a preferred structure of temperature regulating means and cooling means in the apparatus shown in FIG. 1.

FIG. 3 is a schematic view showing warping occurring on the hollow planar board.

FIG. 4 is a schematic sectional view of an apparatus adapted for forming a core having independent closed cells according to the present invention.

FIG. 5 is an enlarged side elevation showing in vertical section the structure of a vacuum chamber in the apparatus shown in FIG. 4.

FIG. 6 shows a preferred arrangement of the closed cells on the core.

FIG. 7 is a perspective view of a box or container made from a hollow planar board having the core with such a closed cell arrangement.

Figure 8:
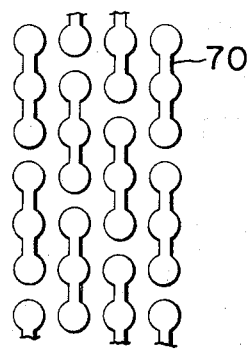
FIG. 8 shows another preferred closed cell arrangement in which a plurality of such closed cells communicate with each other.

Referring to FIG. 1, a structure 1 is an assembly of a core of synthetic resin material preformed into a desired shape and a first liner of synthetic resin material bonded to the core in the preceding stage. This structure 1 is fed into the nip between a pair of bonding rolls 3 and 4, and a second liner 2 of synthetic resin material in molten sheet form is extruded from an extruder and supplied into the nip between the rolls 3 and 4 to be bonded to the structure 1 thereby forming a hollow planar board 8. This hollow planar board 8 is fed into a temperature regulator 5 which is adapted to control the surface temperature $t_1$ of the second liner independently of the surface temperature $t_2$ of the first liner. During passage through the temperature regulator 5, the hollow planar board 8 is subjected to cooling on the side of the second liner and heating on the side of the first liner while being pressed by a flattening pressure applied thereto so that the surface temperature $t_4$ of the first liner of the hollow planar board 8 at the outlet of the temperature regulator 5 is above 40°C. and higher by at least 20°C. than the surface temperature $t_3$ of the second liner at the same position. Although the surface temperature $t_4$ of the first liner at the position at which the hollow planar board 8 leaves the temperature regulator 5 is variable depending upon the factors including the kind of the synthetic resin used, the velocity with which the hollow planar board 8 is fed by the rolls 3 and 4, and the period of time required for the hollow planar board 8 to pass through the temperature regulator 5, good results can be generally obtained when this temperature $t_4$ is maintained at a highest possible temperature below the melting point in order to satisfactorily avoid undesirable warping. The hollow planar board 8 leaving the temperature regulator 5 is subsequently fed into a cooler 7 in which the hollow planar board 8 is cooled on both surfaces thereof to room temparature while being pressed by a flattening pressure applied thereto. In order to ensure complete freedom from warping, an auxiliary heater 6 may be used between the temperature regulator 5 and the cooler 7 so as to apply additional heat to the first liner of the hollow planar board 8 within a temperature range below the melting point. Means for applying the flattening pressure to the hollow planar board 8 in the temperature regulator 5 and cooler 7 may be a belt of rubber, metal or any other suitable material or a plate of metal or any other suitable material, preferably having a surface coating of material such as Teflon which reduces surface friction. In the present invention, a pair of rubber belts were employed.

A preheater 9 may be used as required to preheat the structure 1 consisting of the core and the first liner so as to ensure reliable bonding of the second liner 2 to the structure 1. In the temperature regulator 5, heat is applied to the hollow planar board 8 from the side of the first liner. The term "heating" is used in the present invention to include raising the surface temperature of the first liner but also maintaining the surface temperature of the first liner at the same level at the inlet and outlet of the temperature regulator 5, that is, maintaining such temperature so that the relation $t_4 = t_2$ holds.

A preferred structure of the temperature regulator 5 and cooler 7 is shown in detail in FIG. 2 in which like reference numerals are used to denote like parts appearing in FIG. 1. The temperature regulator 5 comprises a pair of rubber belts 12 arranged for conveying the assembly consisting of the structure 1 and the second liner 2 in molten sheet form while applying a flattening pressure thereto. the upper run of the upper rubber belt 12 is cooled by cold water contained within a cooling water container 11 and the cooled lower run of the upper belt 12 engages the second liner 2 in molten sheet form thereby effectively cooling the second liner 2 by the low temperature. Further, the lower run off the lower rubber belt 12 is heated by hot water contained within a heating water container 10 and the heated upper run of the lower belt 12 engages the structure 1 thereby effectively heating the first liner of the structure 1. The cooler 7 has a structure similar to that of the temperature regulator 5. the cooler 7 comprises a pair of upper and lower belts 12 both of which are subjected to cooling.

Some samples of the hollow planar board made by the method according to the present invention will now be compared with similar samples made by a conventional method.

Samples Nos. 1 – 3 and Comparative Sample No. 1

High-density polyethylene was used to form the core and liners of these samples, and the core and the liners had respective thicknesses of 0.4 mm and 0.2 mm. The temperatures $t_1$ to $t_8$ at various portions of the hollow planar board 8 in FIG. 1 were controlled as shown in Table 1 and warping occurring on the board was measured. (In measuring the warping, the board 8 finally obtained was cut to a length of 1 m as shown in FIG. 3 and the dimension $h$ in mm was measured.) The results are shown in Table 1.

Sample No. 4 and Comparative Sample No. 2

Polypropylene was used to form these samples, and the core and liners had respective thicknesses of 0.4 mm and 0.2 mm. The temperatures $t_1$ to $t_8$ at various portions of the hollow planar board 8 in FIG. 1 were controlled as shown in Table 2 and warping occurring on the board was measured. The results are shown in Table 2.

Table 2

| | $t_1$ (°C) | $t_2$ (°C) | $t_3$ (°C) | $t_4$ (°C) | $t_5$ (°C) | $t_6$ (°C) | $t_7$ (°C) | $t_8$ (°C) | Warping (mm/m) |
|---|---|---|---|---|---|---|---|---|---|
| Comparative Sample No. 2 | 160 | 80 | 40 | 40 | 40 | 40 | 20 | 20 | 150 |
| Sample No. 4 | 160 | 80 | 50 | 80 | 60 | 100 | 20 | 20 | 0 |

In the case of the samples Nos. 2, 3 and 4, the temperatures $t_5$ and $t_6$ were higher than the temperatures $t_3$ and $t_4$ respectively of the board 8 at the outlet of the temperature regulator 5 due to the fact that the board 8 was heated by the auxiliary heater 6 from the side of the first liner.

The method according to the present invention is applicable not only to polyethylene and polypropylene as has been described above but also to any other suitable thermoplastic synthetic resins including polystyrene and polyvinyl chloride.

The forming of the core, which is the second object of the present invention, is carried out by an apparatus disposed in the preceding stage of the apparatus shown in FIG. 1.

FIGS. 4 and 5 show an apparatus preferably used for obtaining a core which is provided with many projections for forming closed cells without accompanying the clogging problem described previously. Referring to FIGS. 4 and 5, an endless embossing belt 51 of heat resisting material such as synthetic rubber, Nylon or Teflon having a substantial thickness is provided with a multiplicity of perforations 52. This embossing belt 51 is driven by a driving pulley 53. A soft or molten film or sheet 54 of synthetic resin material is supplied onto the upper surface of the upper run of the embossing belt 51 so as to be fed to a position above a vacuum box or chamber 55. At this position, portions of the film or sheet 54 are drawn downward by the vacuum suction applied from the vacuum chamber 55 so that a multiplicity of projections are formed on the sheet 54 to protrude into the perforations 52 of the embossing belt 51.

Table 1

| | $t_1$ (°C) | $t_2$ (°C) | $t_3$ (°C) | $t_4$ (°C) | $t_5$ (°C) | $t_6$ (°C) | $t_7$ (°C) | $t_8$ (°C) | Warping (mm/m) |
|---|---|---|---|---|---|---|---|---|---|
| Sample No. 1 | 120 | 80 | 50 | 80 | 50 | 80 | 20 | 20 | 20 |
| Sample No. 2 | 120 | 80 | 50 | 80 | 60 | 100 | 20 | 20 | 0 |
| Comparative Sample No. 1 | 120 | 80 | 40 | 40 | 40 | 40 | 20 | 20 | 200 |
| Sample No. 3 | 120 | 80 | 70 | 80 | 80 | 100 | 20 | 20 | 30 |

In the case of the sample No. 1 and comparative sample No. 1, the auxiliary heater 6 was not used, whereas in the case of the samples Nos. 2 and 3, the auxiliary heater 6 was used to apply heat to the board 8. In the case of the comparative sample No. 1, the board 8 was cooled in such a manner that the temperatures $t_3$ and $t_4$ of the second and first liners at the outlet of the temperature regulator 5 were equal to each other.

An endless air pervious belt 56 is arranged to run in synchronism with the embossing belt 51 in contact with the lower surface of the embossing belt 51 for forming bottoms of the perforations 52 of the belt 51. This air pervious belt 56 is formed from a material such as a metallic screen, a sheet or fabric of synthetic resin or glass fibers having a multiplicity of continuous pores for applying vacuum suction to the sheet 54 through the belt 51. The surface of the air pervious belt 56 may be covered with a material such as polytetrafluoroethylene so as to facilitate the detachment of the product from such surface. This air pervious belt 56 is driven by a driving pulley 57 to run at the same velocity as that of the embossing belt 51. A protective belt 56' may be additionally employed so as to minimize friction due to the direct frictional contact between the air pervious belt 56 and a cover plate 55' of the vacuum chamber 55 when the belt 56 is made of a relatively wearing material. This protective belt 56' is in the form of a wire gauze, perforated steel sheet or any other suitably perforated member and is driven by a driving pulley 57' to run at the same velocity as that of the air pervious belt 56.

It will be understood from the above description given with reference to FIGS. 4 and 5 that the air pervious belt 56 of porous structure is arranged to run independently of the embossing belt 51 so that this belt 56 need not be removed from the apparatus for cleaning even when clogging occurs on the air pervious belt 56. A suitable cleaning means may be disposed at a position adjacent to the return run of the belt 56 returning from the engagement with the embossing belt 51 so as to easily remove the material clogging the pores of the air pervious belt 56.

Further, the independent drive of the air pervious belt 56 and the embossing belt 51 is convenient in that not only the clogging can be easily removed but also the product subjected to the embossing treatment can be easily detached from the embossing belt 51. In the case of the prior art apparatus of this kind, there is no means other than stripping the product off the embossing belt in the upward direction and thus it is very difficult to detach the product when the projections of the product adhere to the inner walls of the perforations of the embossing belt. In the present invention, however, this is easily attained by a suitable means 58 as shown which is provided with many projections engageable with the perforations 52 of the embossing belt 51 for forcedly detaching the product from the embossing belt 51. Thus, the apparatus shown in FIGS. 4 and 5 is advantageous in that the material clogging the air pervious belt 56 can be easily removed and the embossing belt 51 and the air pervious belt 56 can be removed for inspection independently of each other.

FIG. 6 shows a preferred geometrical arrangement of closed cells formed on the core of the hollow planar board made by the method according to the present invention. As seen in FIG. 6, a multiplicity of closed cells 65 to 68 are arranged on respective straight lines $x_1$ to $x_4$ which are parallel with each other and make a suitable angle $\theta$ with either the longitudinal direction or the transverse direction of the hollow planar board. In the illustrated example, the lines $x_1$ to $x_4$ make the angle $\theta$ with the transverse direction of the hollow planar board. Further, these closed cells 65 to 68 are arranged in such a relation that any one of the closed cells on one of the lines $x_1$ to $x_4$ lies substantially intermediate between the two contiguous closed cells on the adjacent lines so that usually several closed cells are situated on all the lines extending longitudinally and transversely across the hollow planar board. As seen in FIG. 6, several closed cells are situated on a transverse line B-B' and on a longitudinal line C-C'.

Therefore, when this board is suitably cut to form a box as shown in FIG. 7, a plurality of closed cells exist necessarily on any one of the cut end edges or welding lines so that the cut end edges can be easily welded to each other, and due to the fact that the welded portions have a sufficient mechanical strength, the welded portions would not be separated from each other even when a mechanical load is applied to the box. In other words, a rigid weld can be easily obtained due to the fact that heat applied for welding fuses the closed cell portions and these fused closed cell portions contribute to firm welding of the cut end edges to each other.

Further, the box (shown in FIG. 7) made in the manner above described is free from any deformation of breakage even when a mechanical load is applied to the side walls thereof by virtue of the fact that the closed cells lie on all the longitudinal and transverse lines extending across the hollow planar board constituting the box and all the side walls have an equal mechanical strength of large magnitude. Also, no or little bulging of the side walls would take place even if a relatively heavy material is contained in such a box.

Figure 9:
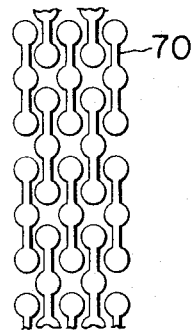
FIG. 9 shows a further preferred closed cell arrangement similar to that shown in FIG. 8.
Figure 10:
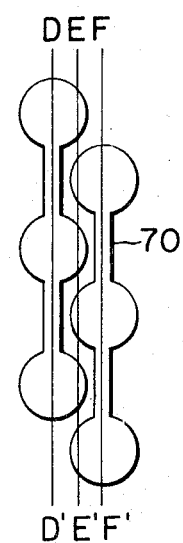
FIG. 10 is an enlarged detail view of parts of the arrangement shown in FIG. 9.

FIGS. 8 to 10 show other two different forms of preferred closed cell arrangement in which a few closed cells on each of straight lines are connected together to form a closed cell unit.

Referring to FIG. 8, there is shown a multiplicity of closed cell units each of which consists of three equally spaced closed cells communicating with each other through a communicating portion 70. These closed cell units are arranged on equally spaced parallel longitudinal lines in such a relation that the central closed cell in one closed cell unit on any one of the longitudinal lines is staggered by one closed cell from the central closed cell in the corresponding closed cell unit on the adjacent longitudinal line and that all the closed cells are situated at the intersections between the longitudinal lines and equally spaced transverse lines.

FIG. 9 shows another closed cell unit arrangement which is preferable over the arrangement shown in FIG. 8. This arrangement is similar to that shown in FIG. 6 in that some closed cell units exist necessarily on every transverse line so as to prevent the board from being bent or severed in the transverse direction. In addition, in the arrangement shown in FIG. 9, some closed cells exist necessarily on all the longitudinal lines so as to prevent the board from being bent or severed in the longitudinal direction.

More preferably, as shown in detail in FIG. 10, two closed cell units are arranged adjacent to each other in a relation as shown, and a longitudinal line E-E', which is equally spaced from two longitudinal lines D-D' and F-F' extending longitudinally through the center of the respective closed cell units, cuts across all the closed cells in these closed cell units. This arrangement can be attained by suitably determining the relation between the distance between these two adjacent closed cell units and the size of the closed cells in these units.

The hollow planar board having such a closed cell unit arrangement has a mechanical strength comparable to that of conventional cardboard of this kind in that it can sufficiently withstand a load applied thereto in the longitudinal and transverse directions and yet it has a sufficient compressive strength against a load applied to the surface thereof. Further, its compressive strength against a load applied in the vertical direction is very greater than that of conventional cardboard by virtue of the properties above described, and it exhibits a satisfactory shock absorbing effect. Therefore, a plurality of boxes formed from the board made according to the present invention can be stacked up without any fear of bending or breakage of the lower boxes due to the weight of the superposed boxes.

While a closed cell unit consisting of three closed cells has been illustrated by way of example, it is apparent to those skilled in the art that the number of these closed cells may be suitably selected depending on the service.

In general, it will be understood that various changes in the details, which have been herein described and illustrated in order to explain the nature of the invention, may be made by those skilled in the art within the principle and scope of the invention as expressed in the appended claims. For example the closed cell may take other shape such as a triangular, rectangular or other polygonal shape or an oval shape.

What is claimed is:

1. A method of making a hollow planar article of synthetic thermoplastic resin material comprising the steps of applying by melt extrusion a first surface layer to one of the surfaces of an embossed core having a multiplicity of closed cell groups, applying by melt extrusion to the other surface of said core a second surface layer while it is still in a molten state although it can maintain its planar shape, the first surface layer being at a temperature of above 40°C., feeding the three-layer structure into temperature regulating means for cooling at least portions of said second surface layer and, at the same time, heating opposed portions of said first surface layer while applying a flattening pressure to said three-layer structure so that the temperature of said first surface layer at the outlet of said temperature regulating means will be maintained at the same level above 40°C. as at the inlet thereof and higher than the temperature of said second surface layer at said outlet, and then feeding said three-layer structure into cooling means for cooling said three-layer structure down to room temperature while applying a flattening pressure thereto.

2. A method of making a hollow planar article as claimed in claim 1, wherein the temperature of said first surface layer at the outlet of said temperature regulating means is higher by at least 20°C. than the temperature of said second surface layer at said outlet.

3. A method of making a hollow planar article as claimed in claim 1, which comprises further the step of applying additional heat solely to said first surface layer by auxiliary heating means disposed immediately behind said temperature regulating means.

4. A method of making a hollow planar article of synthetic thermoplastic resin material from an embossed core having a multiplicity of closed cell groups, said core having a first surface layer on one of the surfaces of the core and comprising the steps of applying by melt extrusion to the other surface of said core a second surface layer while it is still in a molten state although it can maintain its planar shape, feeding the three-layer structure into temperature regulating means for cooling said second surface layer and, at the same time, heating said first surface layer while applying a flattening pressure to said three-layer structure so that the temperature of said first surface layer at the outlet of said temperature regulating means will be at a temperature above 40°C. but below its melting point and higher than the temperature of said second surface layer at said outlet, and then feeding said three-layer structure into cooling means for cooling said three-layer structure down to room temperature while applying a flattening pressure thereto.

5. A method of making a hollow planar article as claimed in claim 4, wherein the temperature of said first surface layer at the outlet of said temperature regulating means is higher by at least 20°C. than the temperature of said second surface layer at said outlet.

6. A method of making a hollow planar article as claimed in claim 4, in which said core is prepared by extruding a synthetic resin sheet in a molten state from an extruder, guiding said synthetic resin sheet while still in the molten state onto belt means consisting of an embossing belt having a multiplicity of perforations and a separate air pervious belt disposed beneath said embossing belt so as to run at the same velocity as that of said embossing belt, and applying vacuum suction to said synthetic resin sheet from beneath the overlapped portion of said belts.

7. A method of making a hollow planar article as claimed in claim 6 and including the steps of removing the air pervious belt from the belt means, and forcing protruding portions of the synthetic resin sheet extending into the perforations of the embossing belt therefrom, such protruding portions having been drawn into the perforations by the suction action.

* * * * *

UNITED STATES PATENT OFFICE
CERTIFICATE OF CORRECTION (AMENDED)

Patent No. 3,833,440      Dated Sept. 3, 1974

Inventor(s) Yoshikazu Kashiwa et al

It is certified that error appears in the above-identified patent and that said Letters Patent are hereby corrected as shown below:

Column 5, line 23, "off" should be --of--.

Column 5, line 29, "the" should be --The--.

Column 8, line 8, "of" should be --or--.

Delete from the item "[75] Inventors:" the last part "Kabushiki Kaisha Tomoku, 03, Otaru-shi, both of Japan".

Add to the item "[73] Assignee:" -- Japan and Kabushiki Kaisha Tomoku, Otaru-shi, --

Add the item "(30) - Title Page - Foreign application priority data:

| | | | |
|---|---|---|---|
| June 10, 1971 | Japan | Patent | 46-40556 |
| March 2, 1972 | " | U.M. | 47-25202 |
| April 4, " | " | " | 47-39119 |
| April 11, " | " | " | 47-41997 |
| April 11, " | " | " | 47-41998". |

Signed and sealed this 20th day of May 1975.

(SEAL)
Attest:

RUTH C. MASON
Attesting Officer

C. MARSHALL DANN
Commissioner of Patents
and Trademarks